United States Patent
Asaad et al.

(10) Patent No.: US 6,914,604 B1
(45) Date of Patent: Jul. 5, 2005

(54) METHOD AND SYSTEM FOR HIGH RESOLUTION DISPLAY CONNECT THROUGH EXTENDED BRIDGE

(75) Inventors: Sameh W. Asaad, Mahopac, NY (US); Kevin W. Warren, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 09/633,806

(22) Filed: Aug. 7, 2000

(51) Int. Cl.[7] .......................... G06I 1/00; G06F 13/00
(52) U.S. Cl. ..................... 345/520; 345/501; 710/300; 710/104
(58) Field of Search ................... 345/501, 506, 345/519–520, 522; 710/300, 306, 313, 104–105

(56) References Cited

U.S. PATENT DOCUMENTS 5,576,735 A * 11/1996 Kikuchi et al. ............. 345/173
6,070,214 A    5/2000 Ahern
6,097,364 A * 8/2000 Miyamoto et al. ............ 345/97
6,304,935 B1 * 10/2001 Strongin ..................... 345/520

* cited by examiner

Primary Examiner—Regina Liang
Assistant Examiner—Duc Q Dinh
(74) Attorney, Agent, or Firm—Robert M. Trepp, Esq.; McGinn & Gibb, PLLC

(57) ABSTRACT

A method of (and system for) of displaying information, includes an extended bus bridge, a graphics adaptor coupled to the extended bridge, and a monitor coupled to the graphics adaptor to display the information, such that the graphics adaptor is localized to the monitor.

18 Claims, 2 Drawing Sheets

METHOD AND SYSTEM FOR HIGH RESOLUTION DISPLAY CONNECT THROUGH EXTENDED BRIDGE

BACKGROUND OF THE INVENTION

1. Field of the Invention

The present invention relates to a method and display system for displaying an image with high resolution, and more particularly to a method and display system for displaying an image through an extended Peripheral Component Interconnect (PCI) to PCI bridge.

2. Description of the Related Art

FIG. 1 illustrates a generic architecture for a conventional system 100 including a monitor display 101 connected, via a cable 102, to a personal computer (PC) box 110 including a central processing unit (CPU) and host Peripheral Component Interconnect (PCI) bridge 103 and graphics adaptor 104.

In such systems, there is an increasing trend to replace analog cathode ray tube (CRT) desktop monitors 101 with flat panel display monitors. Various factors contribute to this trend including desktop space saving, power saving, higher resolution and crisper images.

As flat panel display technology pushes towards higher resolutions and actually surpasses the capabilities of current CRT monitors, the question of how to connect the computer to the display becomes an issue.

That is, a problem with the architecture shown in FIG. 1 is that the cable 102 from the graphics adaptor 104 in the PC box 110 to the monitor 101 carries faster information (i.e., pixel by pixel description of the image at 60+Hz refresh rate) which is too fast for the graphics adaptor 104/monitor 101 to handle efficiently. Thus, the bandwidth requirements increase drastically when increasing the resolution or refresh rate of the monitor 101.

Moreover, for a digitally-driven flat panel monitor, the bandwidth requirement is scaled again by the number of bits per pixel (i.e., color resolution).

FIG. 2 summarizes the bandwidth requirements for various common display resolutions, bits per pixel and refresh rates.

From the above, it is clear that connection between the PC and the monitor becomes a bottleneck in the system, especially when digital signals (and thus many more bits/information than analog signals) are sent from the graphics adaptor 104 to the monitor 101. Further, the higher resolution that is provided means that more data which must be displayed.

That is, conventionally, the output of the graphics adaptor has rasterization information (e.g., a matrix of lines and within each of the lines pixel-by-pixel are displayed). As mentioned above, with digital signals becoming more prevalent, more data (e.g., in the form of higher refresh rates, higher pixel counts, a higher number of colors, etc.) will be provided to the graphics adaptor, thereby leading to higher bandwidth requirements and hence the bottleneck. Currently, the monitor is "dumb" and only knows what pixels to place at which point Thus, the higher resolution displays will cause a severe bottleneck between the graphics adaptor and the monitor.

Additionally, there are electromagnetic induction (EMI) and power dissipation problems. That is, because this system configuration forces a serial connection, the frequency of transmission is high and this aggravates power and EMI. In addition, the current digital serial display connections are dedicated and "one-way." If there are to be other output devices in the display (speakers, etc.), or input devices (keyboard, mouse, camera, etc.), then other connection mechanisms must be added. These additional connections are not possible with the current dedicated display connections.

Thus, hitherto the present invention, no satisfactory solution has been proposed.

SUMMARY OF THE INVENTION

In view of the foregoing problems, drawbacks, and disadvantages of the conventional systems, it is an object of the present invention to provide a structure and method for using an extended PCI-PCI Bridge (e.g., a PCI-to-PCI or Accelerated Graphic Port (AGP)-to-AGP bridge) for connecting a computer to a display subsystem.

In a first aspect of the present invention, a system and method for displaying information, includes an extended bus bridge, a graphics adaptor coupled to the extended bridge, and a display monitor coupled to the graphics adaptor to display the information, such that the graphics adaptor is localized to the display monitor.

In a second aspect, a display unit includes at least a portion of an extended bus bridge, a graphics adaptor coupled to the at least the portion of the extended bridge, and a display monitor coupled to the graphics adaptor to display the information, such that the graphics adaptor is localized to the display monitor.

In a third aspect, a method of decreasing a bottleneck in a communications bus, includes providing an extended bus bridge between a graphics adaptor and a central processing unit (CPU), and localizing the graphics adaptor to a display monitor.

Generally, the invention provides an extended PCI-PCI (or AGP) Bridge for connecting the computer to the display subsystem.

Moreover, the invention takes the graphics adaptor away from the system PC box and instead places the graphics adaptor with the monitor. Thus, the graphics adaptor is "localized" with the monitor (e.g., placed/positioned with or in the monitor), thereby avoiding the bottleneck caused by the cable having to carry all of the bandwidth of the high resolution image.

Further, in the invention, only information that changes needs to be carried across the cable (e.g., static information which does not change need not be carried continuously across the cable to the graphics adaptor). For example, assuming that a refresh rate of 60 Hz is increased to 80 Hz, then this simply means that more data must be sent since there is no frame buffer or any memory on the monitor side to understand that the refresh rate simply must be increased and the system must increase the rate. However, this operation is not relevant to the graphics adaptor, and thus need not be communicated across the cable to the graphics adaptor. The inventive solution moves the graphics adaptor from the CPU/PC side to the display side, and only information which changes is sent to the graphics adaptor. If the data does not change, then it is not sent to the graphics adaptor, thereby freeing bandwidth. Hence, if a faster refresh is desired, nothing is changed on the cable and thus it is not sent to the graphics adaptor.

Thus, with the unique and unobvious features of the invention, as flat panel display technology pushes towards higher resolutions and surpasses the capabilities of current CRT monitors, the computer can be efficiently and easily connected to the display without any bottleneck being created.

That is, even when the bandwidth requirements increase drastically when increasing the resolution or refresh rate of a monitor (e.g., even a digitally-driven flat panel monitor), there is no bottleneck between the connection between the PC and the monitor.

Additionally, because the adapter is in the display, the connection between the adapter and the display can be parallel, not serial (e.g., as shown in FIG. 3 and described below). This means that the frequency of operation can be reduced and still maintain a high bandwdith. Also, because the high bandwdith connections are local to the display, the EMI can be minimized. Moreover, the EMI characteristics of the cable (e.g., always a large source of radiation) now do not change with frame rate or display type. The characteristics are dependent upon the rate of the bus, which is typically "bursty" but fixed, and thus it is much easier and cheaper to characterize and shield. Because the high bandwidth lines are in the display, their length is made much shorter as well, thereby helping to reduce power. Further, because the connection mechanism is not dedicated to the display and is by its nature "two-way", additional input and output devices can be added to the display by adding additional connection support.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
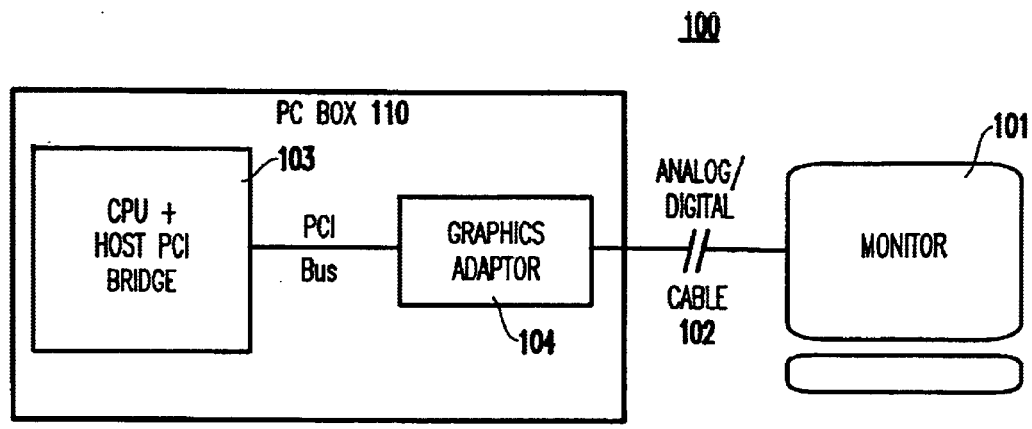
FIG. 1 illustrates a conventional system 100 having a generic architecture.
Figure 2:
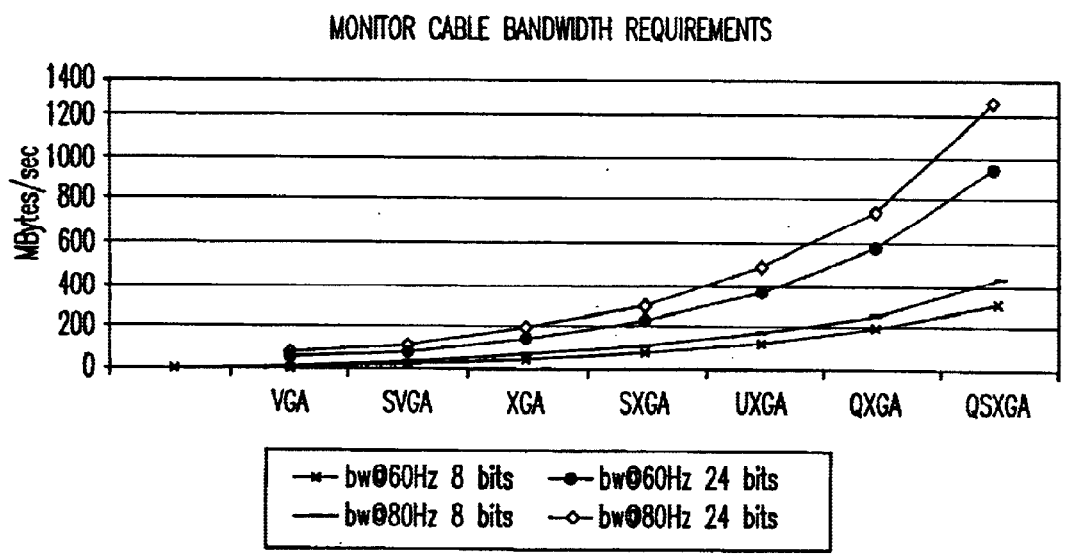
FIG. 2 illustrates a cable bandwidth requirement for digital monitor interconnects.
Figure 3:
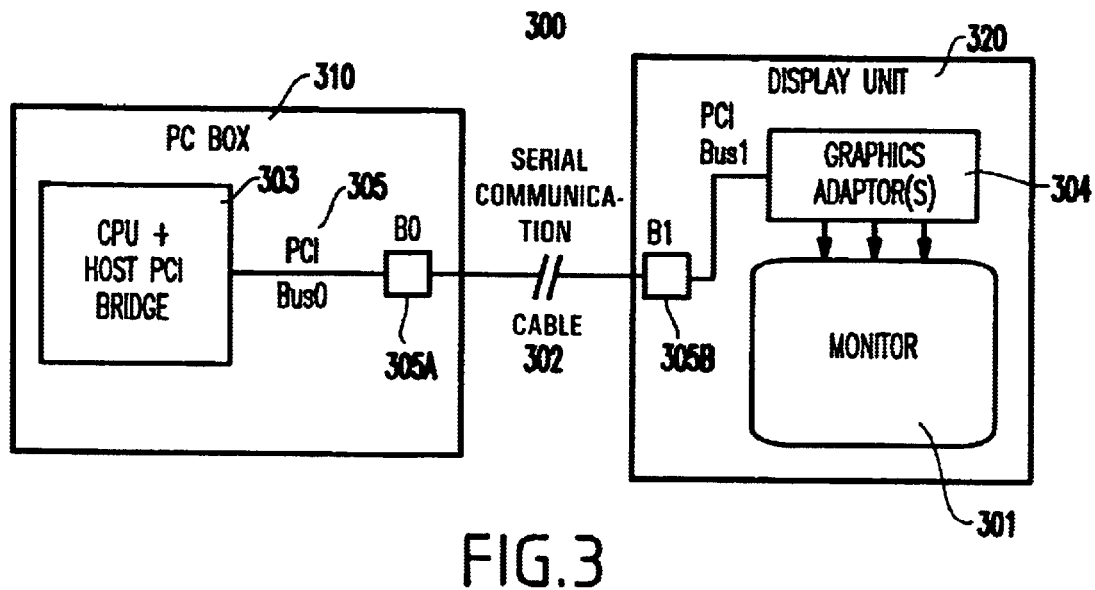
FIG. 3 illustrates an architecture 300 according to a first preferred embodiment of the present invention.
Figure 4:
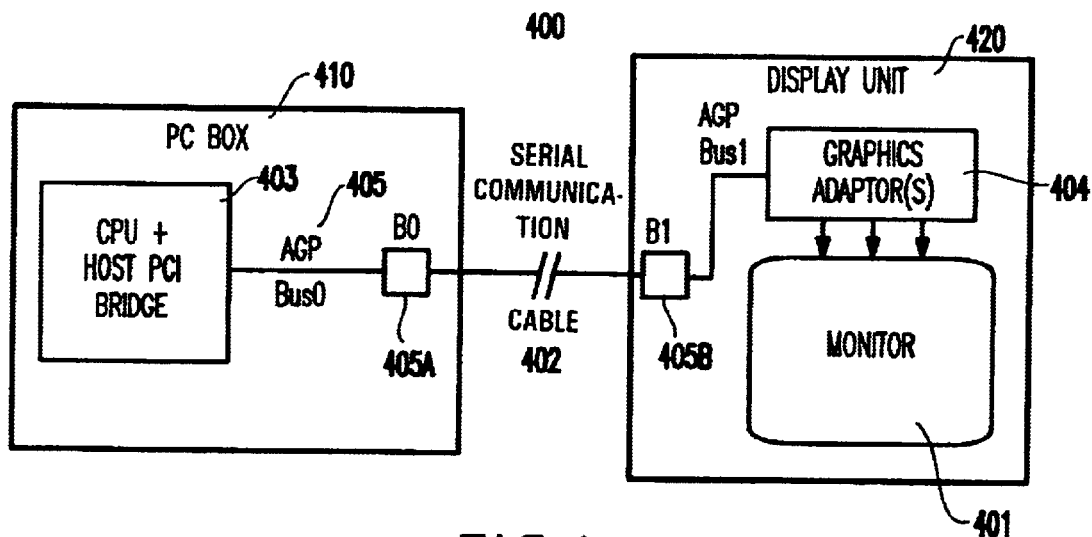
FIG. 4 illustrates an architecture 400 according to a second preferred embodiment of the present invention.

Referring now to the drawings, and more particularly to FIGS. 3–4, there are shown preferred embodiments of the method and structures according to the present invention.

First Preferred Embodiment

To attack the above problems of the conventional architectures, the inventive solution extends the PCI bus by using an extended PCI-PCI bridge and colocates the graphics adaptor(s) with the display itself rather than inside the PC Box 310.

That is, as shown in FIG. 3, a system 300 according to the invention includes a PC Box 310 coupled to a display unit 320 via a cable 302. As shown in FIG. 3, the invention has moved the graphics adaptor 304 as shown to be a part of the display unit 320 and localized to the monitor 301.

The invention utilizes an extended bus bridge 305. In FIG. 3, the bus bridge is shown preferably as a PCI bus bridge 305 having a bus portion 305A on the CPU side and a bus portion 305B on the monitor side. The invention is not limited to the PCI bus bridge and indeed other bus bridges may be employed. For example, as discussed in further detail below, in the second embodiment of the invention, an Accelerated Graphics Port (AGP) bus bridge (e.g., having a bandwidth of 256–512 MBytes/Sec.) may be provided. Additionally, a network bus bridge could be used.

In FIG. 3, B0 is the primary side interface of the chip, and it interfaces to the primary PCI bus (bus 0) as a regular PCI-PCI bridge. All PCI traffic addressed to B0 is serialized across a high-speed serial link using, for example, a Gigabit Ethernet as its physical layer.

On the remote side of the serial cable (e.g., up to 30 meters away), interface B1 converts the serial stream back to PCI traffic and relays it to the graphics card (e.g., graphics adaptor 304) now connected to the secondary PCI (bus 1) as shown.

With this embodiment, many advantages accrue to the invention. For example, graphics data on the cable is at the PCI command level, which is at a much lower bandwidth (e.g., maximum of 132 MBytes/sec for a 32bit/33 MHz PCI system) than the raster data level.

Further, the required cable bandwidth is constant at the PCI rate irrespective of display resolution, number of bits per pixel or refresh rate. This allows the scaling to high resolution displays with the same architecture.

Further, with the above-mentioned advantage, electromagnetic induction (EMI) issues on the cable are resolved.

Additionally, from a systems perspective, the extended bridge of the invention is transparent. The PC sees a regular PCI-PCI bridge which it is designed to handle. No changes are needed in the graphics adaptor design, system basic input/output system (BIOS), operating system (OS) software, device driver software, or application program.

It is noted that a number of digital interconnects for flat panel displays are in use today, such as PanelLink and digital video interface (DVI). However, none of these digital interconnects employs a system repartitioning as described above, and therefore it is difficult for these schemes to scale up with higher resolution panels.

Further, it is noted that there is no limitation on the type of PC box being used since bus portion B0 is preferably implemented as a modular, add-in card which can be "plugged-in" (e.g., inserted) to the PC similarly to inserting a graphics card.

Second Preferred Embodiment

As mentioned above, the invention is not limited to the PCI bus bridge and indeed other bus bridges may be employed.

For example, as shown in FIG. 4, in the second embodiment of the invention, an Accelerated Graphics Port (AGP) bus bridge may be provided instead of the PCI bus bridge. Instead of B0 in FIG. 3, in FIG. 4 a first portion of the AGP bus bridge can be provided on the PC side. Similarly, a second portion of the AGP bus bridge can be provided on the display unit side.

Thus, with the unique and unobvious aspects of the present invention, the invention provides an extended PCI-PCI Bridge or an extended AGP bridge for connecting the computer to the display subsystem.

Moreover, the invention takes the graphics adaptor away from the system PC box and instead places the graphics adaptor with the monitor. Thus, the graphics adaptor is localized with the monitor, thereby avoiding the bottleneck caused by the cable having to carry all of the bandwidth of the high resolution image. In the invention, only information that changes need be carried across the cable (e.g., static information which does not change need not be carried continuously across the cable to the graphics adaptor).

Further, as flat panel display technology pushes towards higher resolutions and surpasses the capabilities of current CRT monitors, the computer can be efficiently and easily connected to the display without any bottleneck being created. That is, even when the bandwidth requirements increase drastically when increasing the resolution or refresh rate of a monitor (e.g., even a digitally-driven flat panel monitor), there is no bottleneck between the connection between the PC and the monitor.

While the invention has been described in terms of several preferred embodiments, those skilled in the art will recognize that the invention can be practiced with modification within the spirit and scope of the appended claims.

For example, the present invention is not limited to the PCI or AGP buses. That is, the inventive approach does not require any software changes (e.g., no changes are needed to the PC BIOS, the operating system, the application software systems, etc.). Thus, system components operate as if each is a local element.

However, notwithstanding the above, the invention can be advantageously used by a network as a network display. In a network application, along with the invention, a scheme for translating the traffic which originally went to the network and redirecting the traffic to the network (e.g., Ethernet or other network) card, etc. would be provided such that the graphics information is transported on top of a network and on the back-end another piece of software, hardware, etc. would be employed to reproduce graphics out of network information.

What is claimed is:

1. A system for displaying information, comprising:
an extended bus bridge, said extended bus bridge including a first portion and a second portion, said first portion comprising a first local bus based on a first bus standard and a first interface to convert a serial signal into said first bus standard, said second portion comprising a second local bus based on said first bus standard and a second interface to convert said first bus standard into said serial signal, said first bus standard defined by a standard of a local internal bus of a computer;
a graphics adaptor coupled to said extended bus bridge at the first portion of said extended bridge;
a central processing unit (CPU) coupled to said second portion of said extended bridge;
a monitor coupled to said graphics adaptor to display the information, such that said graphics adaptor is localized to said monitor and said graphics adaptor and said monitor comprise a display unit; and
a serial link for coupling together said first and second portions of said extended bus bridge, such that at least one of a data bandwidth bottleneck between said graphics adaptor and said monitor and an electromagnetic radiation due to an analog/digital transmission line for display data between said graphics adaptor and said monitor is reduced.

2. The system according to claim 1, wherein said serial link comprises at least one of a cable, a radio frequency (RF) link, and an infrared (IR) link.

3. The system according to claim 1, wherein said extended bus bridge comprises a peripheral component interconnect (PCI) bus bridge.

4. The system according to claim 1, wherein said extended bus bridge comprises an Accelerated Graphics Port (AGP) bus bridge.

5. A display unit, comprising:
at least a portion of an extended bus bridge, said portion comprising a first local bus based on a bus standard and an interface to convert a serial signal into said bus standard, said bus standard defined by a standard of a local internal bus of a computer, said serial signal received as an input signal into said display unit;
a graphics adaptor coupled to said at least portion of the extended bus bridge; and
a monitor coupled to said graphics adaptor to display the information, such that said graphics adaptor is localized to said monitor and said graphics adaptor and said monitor thereby comprise said display unit, such that at least one of a data bandwidth bottleneck between said graphics adaptor and said monitor and an electromagnetic radiation due to an analog/digital transmission line for display data between said graphics adaptor and said monitor is reduced.

6. The display unit according to claim 5, wherein said at least a portion of said extended bus bridge comprises one side of said extended bus bridge embedded in said adaptor.

7. The display unit according to claim 5, wherein said extended bus bridge includes first and second portions, a first portion being coupled to said graphics adaptor.

8. The display unit according to claim 5, wherein said extended bus bridge comprises a peripheral component interconnect (PCI) bus bridge.

9. The system according to claim 5, wherein said extended bus bridge comprises an Accelerated Graphics Port (AGP) bus bridge.

10. A method of decreasing a bottleneck in a communications bus, comprising:
coupling a graphics adaptor, a central precessing unit (CPU) and a display monitor over said communications bus;
providing an extended bus bridge between said graphics adaptor and said central processing unit (CPU) to comprise said communication bus; and
localizing said graphics adaptor to said display monitor such that said graphics adaptor and said monitor comprise a display unit,
wherein said extended bus bridge includes a first portion and a second portion, said first portion comprising a first local bus based on a first bus standard and a first interface to convert a serial signal into said first bus standard, said second portion comprising a second local bus based on said first bus standard and a second interface to convert said first bus standard into said serial signal, said first bus standard defined by a standard of a local internal bus of a computer,
wherein the first portion is coupled to said graphics adaptor and the second portion is coupled to said CPU, and
wherein the first portion and the second portion are coupled to each other via a serial link,
such that at least one of a data bandwidth bottleneck between said graphics adaptor and said monitor and an electromagnetic radiation due to an analog/digital transmission line for display data between said graphics adaptor and said monitor is reduced.

11. The method according to claim 10, wherein said link comprises at least one of a cable, a radio frequency (RF) link, and an infrared (IR) link.

12. The method according to claim 10, wherein said extended bus bridge comprises a peripheral component interconnect (PCI) bus bridge.

13. The method according to claim 10, wherein said extended bus bridge comprises an Accelerated Graphics Port (AGP) bus bridge.

14. The system according to claim 1, wherein said display unit including said first portion of said extended bus bridge is housed in a first enclosure,
wherein said CPU coupled to said second portion of said extended bus bridge is housed in a second enclosure, and
wherein said first and second enclosures are physically separated and connected by a set of wires.

15. The method according to claim 10, wherein said display unit including said first portion of said extended bus bridge is housed in a first enclosure,
wherein said CPU coupled to said second portion of said extended bus bridge is housed in a second enclosure, and
wherein said first and second enclosures are physically separated and connected by a set of wires.

16. The system according to claim 1, wherein subsequent to a refresh operation said serial link is for carrying only information that changes.

17. The system according to claim 10, wherein subsequent to a refresh operation said serial link is for carrying only information that changes.

18. The system according to claim 1, wherein the localized coupling between said graphics adapter and said monitor comprises a parallel interconnection, thereby permitting a faster interconnection.

* * * * *